March 28, 1967 W. SCHULZ 3,311,803
SYNCHRONIZED MOTOR DRIVE UTILIZING SPEED AND PHASE CONTROL
Filed April 22, 1964 2 Sheets-Sheet 1
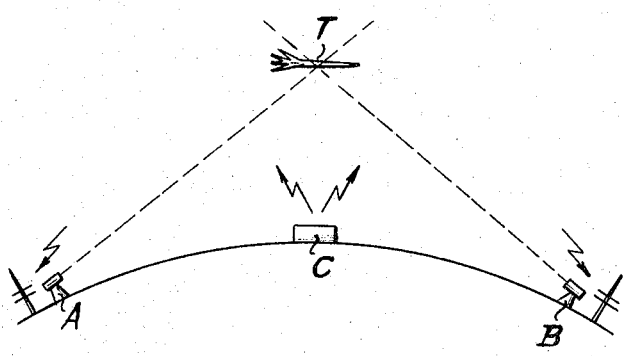
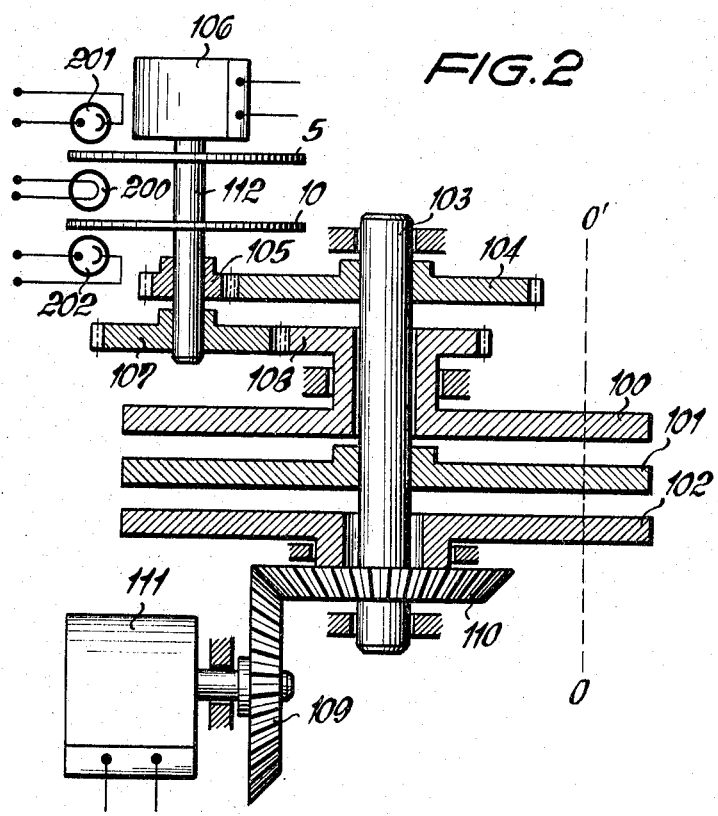

March 28, 1967 W. SCHULZ 3,311,803
SYNCHRONIZED MOTOR DRIVE UTILIZING SPEED AND PHASE CONTROL
Filed April 22, 1964 2 Sheets-Sheet 2
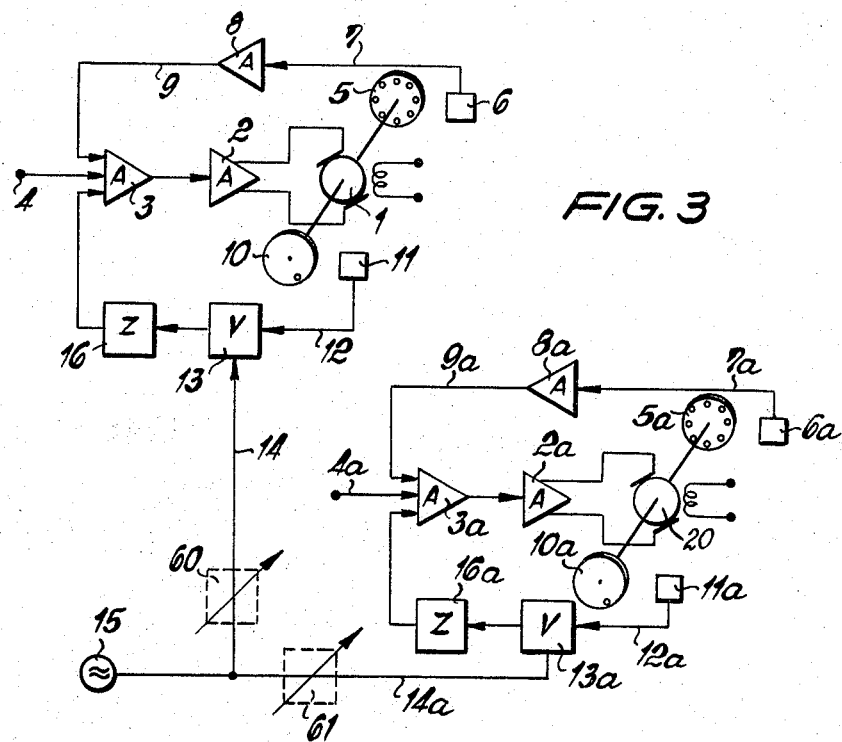
FIG. 3
FIG. 4
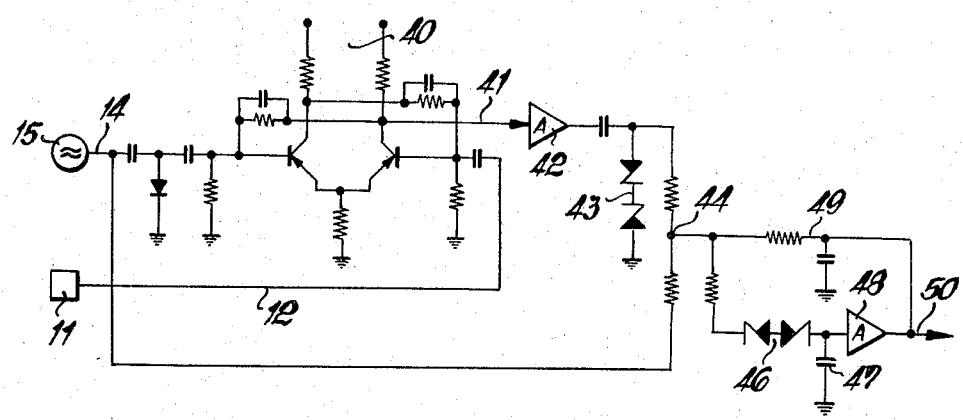

United States Patent Office 3,311,803
Patented Mar. 28, 1967

3,311,803
SYNCHRONIZED MOTOR DRIVE UTILIZING SPEED AND PHASE CONTROL
Winfried Schulz, Berlin, Germany, assignor to Continental Elektroindustrie A.G. Askania-Werk, Berlin-Mariendorf, Germany, a corporation of Germany
Filed Apr. 22, 1964, Ser. No. 361,802
Claims priority, application Germany, Apr. 26, 1963, C 29,781
7 Claims. (Cl. 318—85)

This invention relates to a drive system employing an electric motor which must be synchronized in both speed and phase with another device, such as another similar drive. The invention is of particular use in applications such as the synchronization of the shutter mechanisms of remote photographic cameras, such as the cameras used in recording theodolites employed for recording positional data on objects traversing the sky. As will hereinafter be seen, however, the utility of the invention is not limited to this specific type of system, although the nature of the problems encountered in such a system is such as to maximize the utility of the synchronized drive of the invention.

One manner of obtaining synchronism of motor drives of any type is of course the use of motors of the type designed for such purposes, the stator and rotor windings of the respective motors being electrically connected with each other, thus producing the phase relations of the drive voltage in the winding of both motors which necessarily produce complete synchronization. Alternately, of course, where a common power source of alternating voltage is available, ordinary synchronous motors may be employed with similar results.

The common methods or systems of motor synchronization just mentioned become impractical where the motors to be synchronized are separated by great distances, as is frequently the case in simultaneous photography of distant objects from widely spaced geographic points.

One solution which has been suggested to the problem of synchronizing the drive motors of such devices is the use of multiple-phase motors similar to those which may be driven synchronously from a common power-generating distribution system by employing pulse communications between the locations of the two motors, or to both locations from a third common location, the pulses being employed to generate signals of corresponding frequency and phase, or to act as comparison or reference frequency and phase signals correcting the deviations of oscillators or other power sources at the respective sites, thus in essence producing synchronized alternating voltages driving the motors. Obviously, such systems are of great expense and complexity, particularly when it is considered that it is highly desirable that the accuracy of synchronization must, for many purposes, make the employment of phase synchronization of power-line and similar low frequencies completely inadequate for the ultimate purpose, the time accuracies to which synchronization must be achieved being such a negligibly small phase error at power-line frequencies that the accuracy of synchronization obtainable with any known systems (whether the motors be remote or otherwise) are inadequate. It is thus necessary to drive such motors at high frequencies, in order that phase accuracy which is reasonably achievable may represent sufficient accuracy of synchronization in time. The employment of high-frequency motors, together with the remote frequency and phase synchronization provision, represents an extremely expensive and complex solution to the problem of providing such synchronized drives.

It is accordingly the object of the present invention to provide a synchronized drive system for such purposes, and for other purposes of similar requirements of precision in synchronization, particularly of devices at relatively remote locations.

A simple form of electric motor drive which is used in a variety of applications, including the operation of cameras, both for theodolites and other purposes, is the D.C. motor, employing variation of the applied direct voltage for speed regulation and control, particularly with shunt-wound motors. It will be seen that in principle it is possible to synchronize the speeds of two such motors by employment of error signals representative of speed differences to change the voltage applied to one or both and thus restore identity or synchronization of speed. However, when it is considered that the synchronism must exist not only as regards speed but also as regards phase, it will be seen that the ability to employ this simple type of speed control for successful achievement of the requirements presented by systems like the camera systems mentioned requires the solution of a number of interrelated problems. First of all, it will be seen that the frequency identity must have a zero error tolerance, since any residual frequency difference, irrespective of how small, creates a constantly shifting phase difference (it being understood that the term "phase" as used in connection with the direct-current motor drive refers to the phase of shaft rotation). Furthermore, the appearance of a frequency error signal, and the correction of the error to eliminate the frequency difference, even if the residual error is zero, necessarily produces a phase differential which will simply be preserved at its new and incorrect value by the synchronization of the frequency, of which identity has been restored.

In one manner of maintaining the phase synchronism of two such motors, the shafts may be provided with transducers producing pulses at fixed shaft positions. These pulses from the respective motors may be fed to an observation and comparing device in which means are provided for comparing the frequency and phase errors. Upon appearance of phase errors, manifested by time difference between the appearance of the observed pulses, adjustment to bring the phase relations back to normal may be made by over-riding the frequency synchronization for a time sufficient to restore the pulse (phase) synchronism, and systems employing automatic speed regulation with manual over-ride for restoring the phase relations produced during correction of a speed error signal have been devised. However, the speed regulation of the type heretofore employed for maintaining the phase relation require the operation of all motors from a common point over wire lines, and synchronous control of all motors by signals conveniently transmitted by radio or similar link has heretofore not been practically feasible.

In the present invention, there is employed an electric drive of the general type mentioned above, which is made into a simple and economical, but highly accurate and reliable, synchronized drive system for purposes such as synchronization of theodolite camera shutters and similar uses, in addition to many others where the desirable characteristics of the drive of the invention may be employed.

The invention will best be understood from consideration of the embodiment illustrated in the drawing, in which:

FIGURE 1 is a diagrammatic illustration of a theodolite camera system with which the drive of the invention may be advantageously employed;

FIGURE 2 is a more or less schematic illustration of the photographic shutter system of either of two cameras shown in FIGURE 1, for better understanding of the synchronization required in this type of device;

FIGURE 3 is a schematic block diagram of a pair of motor drives synchronized in a manner constituting an embodiment of the invention; and FIGURE 4 is a more or less schematic electrical diagram of a portion of the synchronization system of FIGURE 3.

Referring first to FIGURE 1, the system there illustrated includes motion picture theodolite instruments A and B at widely spaced geographical locations, arranged to track a flying target T, for purposes of determining its trajectory. At fixed intervals, for example about twenty times a second, the image of the target T is recorded photographically by both cameras, together with the orientation data of the cameras. For exact determination of the trajectory of the target T, the successive recordings must be made on both cameras at exactly identical times, in order that the orientation data of azimuth and elevation on the two cameras present in combination a completely accurate identification of the target location. For the purpose of synchronization, there is used a control transmitter C, sending timing signals, hereinafter to be described, which are received at the sites of the respective theodolites A and B and are employed as hereinafter set forth to assure the desired synchronism.

The shutter system of either of the cameras A or B is shown in FIGURE 2. This mechanism consists in general of three aligned common-axis rotary diaphragms 100, 101, and 102, which each have an aperture, the apertures (not seen in the rotational positions illustrated) being at radial distances from the axis such as to pass through the optical path OO' of the camera to form a shutter open only when all three apertures are in alignment. The diaphragms 100 and 101 rotate at different speeds, the diaphragm 101 being secured on a shaft 103 which is driven by means of gears 104 and 105, by a D.C. motor 106, the diaphragm 100 also being driven by the motor 106, but by means of a second set of gears 107, 108, producing a much higher speed, the diaphragm 100 being suitably bearing-supported on, and with respect to, the shaft 103. The speeds of the two diaphragms are in an integral ratio, the aperture in the slower diaphragm 101 determining the picture frequency, and the aperture in the diaphragm 100 determining the open or film exposure time of the shutter. The third diaphragm 102 is an auxiliary shutter, which is driven by means of gears 109, 110 by a separate motor 111, which is connected to the film feed of the camera, and which permits overall opening of the shutter only while the film is stationary.

It will of course be understood that the shutter system illustrated in FIGURE 2 is in itself now known. When using such shutters in plural-camera optical tracking instruments, it is not only necessary, for complete accuracy of the measurement being made with the cameras, that the diaphragms 100 and 101, although rotating at different speeds in each camera, rotate in both cameras with the same respective speeds, but in addition these diaphragms must also have the same relative positions at any time with respect to the light paths OO' of both cameras. Also, of course, a synchronous actuation of the diaphragm 102 in the various cameras is required, but this problem is somewhat less critical, because it is merely necessary to assure that the film advancing is initiated after each exposure only with sufficiently precise timing so that this operation is completed prior to the next exposure.

For the synchronization of the frequency and phase of the diaphragms 100 and 101, the motor 106 has on its shaft 112 two perforated disks (or shutters) 5 and 10. The apertures in the disks are employed with a light source 200 between the disks and photoelectric cells 201 and 202 for the generation of pulses upon operation of the motor.

The control system shown in FIGURE 3 employs two D.C. shunt motors 1 and 20, each corresponding to the motor 106 of FIGURE 2. The respective motors are energized by control amplifiers 2 and 2a respectively. These amplifiers are in turn fed by operational amplifiers 3 and 3a, each having a plurality of inputs as hereinafter described.

The motor shafts, as previously described, drive disks 5 and 5a, which have a large number of pulse-generating apertures or notches. Photocells shown at 6 and 6a produce the desired pulses. It will of course be understood that the form of shaft position transducer illustrated is exemplary only, capacitative or inductive or similar transducers also being known for such pulse production, and, indeed, other types of position transducers of entirely different mode of operation also being usable in the invention in its broader aspects, although in general with less simplicity.

The output pulses from the transducers are impressed on lines 7 and 7a connected to suitable amplifying and converting circuits 8 and 8a producing D.C. voltages proportional to the pulse recurrence frequency of the transducer, and thus to the speed of the shaft, this direct voltage being fed to the respective lines 9 and 9a.

The latter lines each constitute one of the inputs to the respective operational amplifier 3 or 3a, and a D.C. reference voltage is fed to the second inputs 4 and 4a of the respective operational amplifiers. By circuitry which is well known, the voltage of line 9 is compared with the voltage of line or input 4, any difference constituting an error signal which is employed to alter the speed of the motor 1 to establish the speed fixed by the standard voltage 4, and the use of a similar voltage standard in the other drive produces more or less identical speeds without further provision.

The disks 10 and 10a, referred to previously, each have only one aperture, producing in the transducers 11 and 11a, and thus at their outputs 12 and 12a, pulses produced only at identical rotational portions of the shaft cycles, these pulses being used for phase synchronization in the manner to be described below. Henceforth, for simplicity, reference will temporarily be omitted to the synchronization system used with the motor 20 of FIGURE 3, i.e., the operation will be described by reference to the elements employed for controlling the motor 1, it being understood that the elements of the second drive system, indicated by the same numbers with the suffix "a," operate in corresponding fashion.

The phase-indicating pulses constitute one of two inputs to the time-comparison circuit indicated at 13 (bearing the designation V), the other input being from line 14, which is fed by a synchronizing pulse source or generator 15, it being understood that the line 14 (like the line 14a which is its counterpart in feeding the other motor) may be a radio link or similar transmission medium, such elements as carrier modulation, detection, etc., being omitted from the drawing and from this description for obvious reasons. The comparing circuit 13 produces at its output pulses of a width or duration proportional to (or otherwise according with) the time interval between the pulses at the two inputs, which will of course alternate in occurrence at the two inputs if the rotational motor frequency is at least approximately correct.

The series of pulses representing by their duration the phase difference, their frequency being fixed by the pulses transmitted from the standard generator 15, are fed to frequency-control conversion circuit 16, which is preferably of a polarity-reversal error signal output, which is zero in the case of null or proper phase, with phase deviations manifesting themselves as either positive or negative D.C. voltages, increasing in correspondence with the degree of deviation from correct phasing. The error voltage is fed to a third input of the operational amplifier 3, and produces a corresponding speed increase or reduction, depending on the size and sign of the synchronization error, until equilibrium is reached, which will occur at or near the point of zero error signal.

The manner of obtaining the zero or null error signal, with opposite polarities representing opposite deviations, will be described in more detail below. It will be obvious, however, that although such an error signal provision is desirable, it is not entirely necessary to the system, which may be designed with a normal output signal from the phase detector which varies in magnitude, rather than polarity, this normal signal accordingly being taken into account in the setting of the standard signal 4 which is the reference voltage for control of the speed. Irrespective of this, however, it will be noted that the illustrated system produces some unusual features of operation. This may best be understood by considering the effect of, for example, a change in speed caused by a change in mechanical load, such as might be produced by a change in temperature. An assumption will be made that the change occurs too rapidly to be followed by the system, so that there exists a time when there has been introduced (by an integrated speed error) a phase error which is appreciable. Such assumptions are of course necessary in analyzing the operation of any such system, even though in practice the sequence of causes and effects, etc., cannot be readily observed because of the speed of response.

As the mechanical load is increased (which will be the assumed condition), the speed begins to fall, thus producing an error signal in the speed portion of the system inclining to increase the speed. At the same time, there has been produced a phase lag in the motor, which likewise produces an error signal operating in the same direction. Both error signals exist until the original or standard speed is reached. However, it will be observed that until this is reached, the phase error signal continues to grow, while the frequency or speed error signal diminishes.

At the point where the speed reaches its standard value, the frequency or speed error signal disappears, but the phase error signal is now at its maximum, thus still accelerating the motor. As the motor accelerates above the normal or synchronous speed (which it must do in order to correct the phase error), the phase error signal commences to decrease, and at the same time there appears a negative or opposite error signal in the frequency or speed comparison system, so that the frequency or speed now commences to return to its equilibrium value, the two error signals (now working "against" each other) falling to their original or standard values. It may be here be noted that in fact, as will be observed on close examination, the ultimate equilibrium condition is not fully identical with that which originally existed unless the operational amplifier device 3 is of the "null" type producing no residual error; this of course follows from the fact that under the assumptions made a slightly higher voltage will be required to produce the proper speed, when applied to the motor, so that there will be a very slight shift in the equilibrium condition at the input when the new steady state is reached.

This interaction of the two error signals, whereby they are first additive, and then subtractive, in correcting any error which may appear, produces substantial advantages both in speed of response and in freedom from the possibilities of hunting, etc., which might result if it were attempted to follow fast changes with comparable speed to that given by the present system, without providing the damping effect which each of the two error signals provides upon the other in the phase-restoring part of the operation, after the speed error has been corrected and is over-corrected for re-establishment of the phase.

As indicated above, since the pulse generator or phase reference signal source 15 fixes the phase of the two respective motors, it in effect locks them to each other. In FIGURE 3 there are shown at 60 and 61 optional delay devices 60 and 61 in the respective transmission paths, which may be employed to compensate for any difference in transit times between the location of the synchronizing source 15 and the two (or more) drives being synchronized.

FIGURE 4 shows in greater detail the portion of the system of FIGURE 3 wherein the phase error signal is produced.

As shown in FIGURE 4, a bistable multivibrator 40 has one input connected to the line (or other transmission path) 14 from the pulse generator 15 and the other input connected to the output line 12 from the phase transducer 11. The pulses from the generator 15 are of carefully controlled standard duration and of fixed frequency and phase. The multivibrator 40 is tripped by the leading edge of the pulse from the standard source 15, and then tripped in the opposite direction, terminating the output pulse of the multivibrator, by the sharp pulse from the transducer 11, thus producing an output pulse from the multivibrator 40 at its output 41 which is of duration extending from the time of the leading edge of the rectangular pulses from reference source 15 to the time of occurrence of each needle pulse. By means of an amplifier 42 and a pair of Zener diodes 43, the output pulses from 41 are impressed at 44 with symmetrical standardized pulse heights. This standardized and symmetrical voltage, whose pulse height corresponds to the height of the pulses of the source 15 (also standardized in amplitude by means not shown), is added to the output voltage of the source 15. The summation voltage, which is available at the junction point 44, is conducted to a time-constant circuit 49, and fed to the output line 50. At the same time, the summation voltage controls the oppositely connected series Zener diodes 46, which feed an integration condenser 47. The integrated voltage on the condenser is detected by an amplifier of high input resistance and likewise fed to the line 50 as so amplified. The Zener diodes 46 and the condenser 47 form in combination with the amplifier 48 a circuit with substantially complete integral transmission characteristics, since the positive or negative pulse voltage at the junction point 44 must overcome the Zener voltage of the respective diode which is in the opposing direction, and then charges the condenser 47 through the diode thus broken down and the forward diode. Since the pulse voltage at the junction point 44 has a width or duration which is proportional to the time interval error between the pulses from the transducer 11 and those from the source 15, the condenser will in the steady state charge to the constant pulse peak value irrespective of pulse width, if the input resistance of the amplifier 48 is sufficiently high, the pulse width merely determines the charging time of the condenser 47. Therefore if the voltage range is sufficiently limited to be smaller than the peak voltage of the condenser, the system 46, 47, 48 has a wide range of signal responses.

The voltage of the output error line 50 is of course fed to the input of the control amplifier 3.

Although the particular embodiment of the invention herein described is highly advantageous, persons skilled in the art will readily see many other manners of applying the basic teachings of the invention. Accordingly, the scope of the protection to be given the invention should not be limited by the particular embodiment herein illustrated and described, but should extend to all utilizations of the invention as described in the claims appended hereto, or which are equivalent.

What is claimed is:

1. A synchronized motor drive comprising:
   (a) a motor having a voltage-responsive shaft speed,
   (b) means for generating a voltage responsive to the shaft speed and independent of shaft phase at any given speed,
   (c) means responsive to deviation of said speed-responsive voltage from a standard value to alter the voltage impressed on the motor to vary the shaft speed in the direction to restore the standard value, characterized by the improved construction having:

(d) means for generating a voltage responsive to the phase of the shaft rotation, (e) and means responsive to deviation of the phase-responsive voltage from a standard value to alter the voltage impressed on the motor to vary the shaft speed in the direction to restore the standard value.

2. A synchronized motor drive comprising:

(a) a motor having a voltage-responsive shaft speed, (b) means responsive to deviation of shaft speed from a standard speed and independent of shaft phase at any given speed for varying the voltage applied to the motor in the direction to restore the standard speed, and (c) means responsive to deviation of shaft phase from a standard phase for varying the voltage applied to the motor in the direction to restore the standard phase.

3. A synchronized drive pair comprising two of the drives of claim 2 having mutually independent means to fix nominally identical reference standard speeds but having a common means fixing the reference standard phase.

4. The drive pair of claim 3 wherein the means for fixing the reference standard speed include speed-responsive voltage generators and standard reference voltages compared therewith and the means for fixing the reference standard phase comprises a single pulse generator having its output fed to both drives.

5. The drive pair of claim 4 wherein the means for varying the voltage to restore the phase in each drive comprises means responsive to shaft position to generate pulses in synchronism therewith and means to compare the phase of these pulses with the phase of the pulse generator output.

6. The drive pair of claim 5 wherein the comparing means comprises means for generating pulses of duration corresponding to the difference between the phase of the shaft-position-generated pulses and the reference standard phase fixed by the pulse generator output pulses.

7. The drive pair of claim 6 wherein said pulses of such duration are of a polarity corresponding to the direction of said phase difference, and having means to integrate said pulses to produce a correction signal.

References Cited by the Examiner

UNITED STATES PATENTS

| | | | |
|---|---|---|---|
| 2,794,945 | 6/1957 | Celmer | 318—326 X |
| 3,241,023 | 3/1966 | Eby | 318—341 X |

ORIS L. RADER, *Primary Examiner.*

B. A. COOPER, *Assistant Examiner.*